US004001601B2

United States Statutory Invention Registration [19]

[11] Reg. Number: H1601

Machado et al.

[45] Published: Oct. 1, 1996

[54] COMPATIBILIZED POLYKETONE POLYMER BLEND

[75] Inventors: Joseph M. Machado; Randall P. Gingrich, both of Houston, Tex.

[73] Assignee: Shell Oil Company, Houston, Tex.

[21] Appl. No.: 396,809

[22] Filed: Mar. 2, 1995

[51] Int. Cl.[6] ..... C08L 55/00

[52] U.S. Cl. ..... 525/433; 525/421; 525/426

[58] Field of Search ..... 525/421, 426, 525/433, 468

[56] References Cited

U.S. PATENT DOCUMENTS 4,880,908 11/1989 Lutz et al. .

5,079,316 1/1992 Sun ..... 525/63

5,124,402 6/1992 Laughner ..... 525/67

5,210,137 5/1993 Machado .

*Primary Examiner*—Charles T. Jordan

*Assistant Examiner*—John R. Hardee

*Attorney, Agent, or Firm*—Todd F. Volyn

[57] ABSTRACT

A blend of polyketone and polycarbonate polymers is presented. The polymer blend is produced by blending polyketone polymer, polycarbonate polymer, and a reactive graft compatibilizer. The a reactive graft compatibilizer compatibilizes the blend.

7 Claims, No Drawings

COMPATIBILIZED POLYKETONE POLYMER BLEND

FIELD OF THE INVENTION

This invention is related to polyketone polymers. More particularly, the invention relates to compatibilized polyketone polymers blends.

BACKGROUND OF THE INVENTION

Polymers of carbon monoxide and ethylenically unsaturated hydrocarbons, commonly called polyketones, have been known and available for some time. High molecular weight linear alternating polyketones are of considerable interest because they exhibit good physical properties. These polymers can be represented by units of the repeating formula $$-\overset{\overset{\displaystyle O}{\|}}{C}-A-$$

wherein A is the moiety obtained by the polymerization of an ethylenically unsaturated hydrocarbon through the ethylenic unsaturation. This class of polymers is disclosed in numerous U.S. patents assigned to Shell Oil Company and is exemplified by U.S. Pat. Nos. 4,880,865 and 4,818,811 which are incorporated herein by reference.

These polymers are relatively high molecular weight materials having established utility as premium thermoplastics in the production of shaped articles such as containers for food and drink and parts for the automotive industry. These articles and applications can be produced by processing the polyketone polymer according to well known methods.

Semi-crystalline polymers tend to have good chemical resistance but have dimensional stability and toughness characteristics that are not optimal for certain applications. Amorphous polymers, on the other hand, tend to have better dimensional stability than semi-crystalline polymers (less mold shrinkage, and lower coefficient of thermal expansion in useful temperature ranges) and in some instances exhibit better toughness. However, amorphous polymers invariably exhibit chemical resistance characteristics that are inferior to those of semi-crystalline polymers. Indeed, they can be completely insuffuicient for certain applications. Generally, polymer blends possess an average of the properties found in the components. U.S. Pat. No. 4,880,908 to Lutz and Gergen is drawn to a blend of polyketone (which is semi-crystalline) and polycarbonate (which is amorphous). Thus, one might consider a blend of the two types of polymers. Unfortunately, it is has been found that when such blends have been produced the overall properties have not been adequate for certain applications because the two types of polymers have limited compatibility.

In the case of polyketone polymers, it would be advantageous to retain the more desirable properties of the polyketone polymers and yet improve other properties. Finding the correct types and proportions of polymers that will comprise such a blend and determining whether such blends are workable can be complex.

Generally, polymer blends can be classified as either miscible (single-phase) or immiscible (multi-phase). Most combinations of polymers are immiscible. The formation of a dispersed phased in a continuous phase and phase separation (e.g., upon changing temperatures) are common occurrences. Blend morphology can thus be a dynamic phenomenon especially during processing. The introduction of compatibilizers is one method of stablizing and improving the internal structure, or morphology of the blend. Such substances can alter the interfacial tension of blend phases or work via mechanisms such as the formation of an interpenetrating polymer network (IPN) to improve adhesion between phases. Employing theoretical considerations to such problems is not an entirely reliable approach. For example, it has often been found that model compounds that may suggest one or the other such formulations are amenable to a particular mechanism proves to be inaccurate when the polymeric analogues of those models are employed.

Futhermore, the term "blend compatibility" is a utilitarian one. It is used as an overall description of the properties of the blend relative to the expected weighted average properties of the pure constituents. The properties in question are those most relevant to the application of the blend. As such, determining whether a given blend is compatible may be specific to the requirements of the planned application. Nevertheless, it is has been found that among multiphase blends, compatibility generally increases as the strength of the blend interface increases. Thus, most efforts directed toward improving the compatibility of a polymer blend are concerned with strengthening this interfacial region.

Compatibilized polyketone/polycarbonate blends which present properties that are better than those of the binary blends would enhance the range of applications of such blends.

SUMMARY OF THE INVENTION

The present invention is a compatibilized polymeric blend comprising polyketone polymer, polycarbonate polymer, and a minor amount of a reactive graft compatibilizer.

In one aspect of the invention the compatibilizer is a blend of polycarbonate in polyamide which comprises polycarbonate/polyamide graft copolymer.

In another aspect of the invention, a blend is presented comprising between about 70 and 30% wt polyketone, between about 30 and 70% wt polycarbonate, and between about 1 and 20% wt of a reactive graft compatibilizer (weight percents are based on the total weight of the blend).

DETAILED DESCRIPTION

It has been found that a blend of polyketone polymer and polycarbonate polymer compatibilzed with a reactive graft compatibilizer results in a polymeric blend having excellent physical properties. Generally speaking,the materials useful in the practice of this invention include a linear alternating polymer of carbon monoxide and at least one ethylenically unsaturated hydrocarbon (sometimes simply referred to as a polyketone polymer), polycarbonate polymer, and a graft copolymer of polycarbonate and polyamide.

Other common polymers additives may also be included in the blend. For instance, fillers, extenders, lubricants, pigments, plasticizers, and other polymeric materials can be added to the compositions to improve or otherwise alter the properties of the composition. In general, the practice of this invention involves suitably contacting sufficient quantities of the useful material to form the inventive blend.

The polyketone polymers which are employed as the major component of the inventive polymer blend are of a linear alternating structure and contain substantially one molecule of carbon monoxide for each molecule of ethylenically unsaturated hydrocarbon. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula $$\left[CO\left[CH_2-CH_2\right]\right]_x\left[CO\left[G\right]\right]_y$$

where G is the moiety of ethylenically unsaturated hydrocarbon of at least three carbon atoms polymerized through the ethylenic unsaturation and the ratio of y:x is no more than about 0.5. When copolymer of carbon monoxide and ethylene arc employed in the compositions of the invention, there will be no second hydrocarbon present and the copolymer are represented by the above formula wherein y is zero. When y is other than zero, i.e. terpolymers are employed, the $-[CO-(CH_2-CH_2)-]$ units and the $-CO-(G-)-$ units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer of a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, of from about 0.5 dl/g to about 10 dl/g, more frequently of from about 0.8 dl/g to about 4 dl/g.

Preferred methods for the production of the polyketone polymers are illustrated by U.S. Pat. Nos. 4,808,699 and 4,868,282 to Van Broekhoven, et. al. which issued on Feb. 28, 1989 and Sep. 19, 1989 respectively and are incorporated herein by reference. U.S. Pat. No. 4,808,699 teaches the production of linear alternating polymers by contacting ethylene and carbon monoxide in the presence of a catalyst comprising a Group VII metal compound, an anion of a nonhydrohalgenic acid with a pKa less than 6 and a bidentate phosphorous, arsenic or antimony ligand. U.S. Pat. No. 4,868,282 teaches the production of linear random terpolymers by contacting carbon monoxide and ethylene in the presence of one or more hydrocarbons having an olefinically unsaturated group with a similar catalyst.

The polycarbonates employed in the blends of the invention are polyesters of carbonic acid having a structure illustratively formed by an ester exchange between a dihydroxy compound and carbonate diester. The method by which the polycarbonates are produced is not material and polycarbonates produced by a variety of methods are useful in the blends of the invention. It is conventional to prepare polycarbonates either by reacting a carbonate precursor, such as phosgene, and a dihydroxy compound, such as bisphenol A, or by ester exchange between a dihydroxy compound and a carbonate diester, such as a diphenyl carbonate. U.S. Pat. Nos. 3,028,365 and 4,291,15 1 describe preparatory procedures for the production of polycarbonates useful in this invention and are incorporated herein by reference.

The preferred polycarbonates used in the blends of the invention are linear aromatic polycarbonates of the general formula $$\left[AR-(Z)m-Ar-O-\overset{\overset{\displaystyle O}{\|}}{C}-O\right]_p \quad \text{and} \quad \left[Ar-O-\overset{\overset{\displaystyle O}{\|}}{C}-O\right]_p$$

wherein Ar is selected from the group consisting of phenylene and alkyl, aryl, alkoxy, aryloxy, halogen and nitro-substituted phenylene; Z is a divalent hydrocarbon radical containing 1–15 carbon atoms, m is an integer of 0 or 1, and p is an integer of at least 2. The exact value of p is not critical but for commercial applications p is typically chosen to give a number average molecular weight of no more than about 60,000.

The preferred linear aromatic polycarbonate for use in this invention is obtained when Ar in the formulae immediately above is p-phenylene and Z is isopropylidene. This aromatic polycarbonate is prepared by reacting bisphenol A with phosgene and is sold by General Electric Company under the trademark LEXAN®. Commercial polycarbonate typically has a molecular weight of at least 18,000 and a melt processing temperature of at least 235° C.

The compatibilizers usable herein are reactive graft compatibilizers which are generally polymer mixtures which comprise one component identical to, or reactive with, the polyketone component of the blend, and another component identical to, or reactive with, the polycarbonate component of the blend. However, both components of the reactive graft compatibilizer need not be identical with both components of the blend to be compatibilized. The compatibilizer also comprises grafted copolymer of the components of the mixture of the compatibilizer. A mixture of polycarbonate and polyamide which mixture also comprises graft copolymer of polycarbonate and polyamide is one example of such a compatibilizer. The polycarbonate component is identical with the polycarbonate component of the blend while the polyamide component is reactive with the polyketone component of the blend. The mixture commercially available as "DEXCARB" (a product of the Dexter Plastics Company comprising 60% wt polycarbonate and 40% wt polycaprolaction (Nylon 6)) is the most preferred compatibilizer.

It has been found that when a mixture of comparable quantities (by weight) of a polyketone polymer ( especially a copolymer or terpolymer) and polycarbonate polymer are blended together with a minor amount of a reactive graft compatibiler in the relative proportions between about 1:3 Polycarbonate to Polyketone and 3:1 Polycarbonate to Polyketone with between about 1 and 20% wt compatibiler (based on total weight of blend), a novel and useful blend is produced. Preferred proportions of Polycarbonate to Polyketones are between about 1:2 and 2:1 with the addition of between about 1 and 20% wt compatabilizer (based on total weight of the blend).

The compositions of the invention may be modified by one or more conventional additives such as stabilizers and inhibitors of oxidative, thermal, and ultraviolet light degradation; lubricants and mold release agents, fire resistant materials, colorants including dyes and pigments, and other substances to modify the polymer. The additives can be incorporated into the composition at any stage in the preparation of the thermoplastic composition. Preferably the stabilizers are included early to preclude the initiation of degradation before the composition can be protected.

The method of producing the inventive polymer blend is not material so long as a relatively uniform distribution of the components is obtained. Generally speaking, any conventional or known method for producing blends is considered suitable. It is preferred for the blend to have intimate mixing of the polymers. That is, microscopic distribution of the consitituents having the size of the dispersed phase of no more than about 10 microns, preferably about 1 micron is desired.

The inventive blend can be processed by conventional methods such as extrusion and injection molding into various articles of manufacture such as automobile parts, household or outdoor appliance parts, machine housings or other molded articles.

The invention is further illustrated by the following non-limiting examples.

EXAMPLE 1 (Polyketone Formation)

A terpolymer of carbon monoxide, ethylene, and propylene was produced in the presence of a catalyst composition formed from palladium acetate, the anion of triflouroacetatic acid and 1,3-bis(diphenylphosphino)-propane. The melting point of the linear terpolymer was 220° C. and it had a limiting viscosity number (LVN) of 1.8 measured at 60° C. in m-cresol.

EXAMPLE 2 (Blend Preparation)

Blends were prepared of the terpolymer of Example 1, "LEXAN 141-112" (a polycarbonate polymer commercially available from General Electric Plastics), and "DEXCARB 507W" (a 60% wt polycarbonate/40% wt nylon graft copolymer commercially available from Dexter Plastics Company). The blends were prepared as shown in Table 1 and compounded on a 30 mm Haake co-rotating, intermeshing twin screw extruder operating at a melt processing temperature of between about 275° and 285° C. The speed of the screws was about 250 RPM.

Blend A, a blend of polyketone polymer and polycarbonate polymer without reactive graft compatibilizer, was a white opaque melt with poor melt strength and some die swelling.

| SAMPLE | POLY-KETONE (wt %) | POLY-CARBONATE (wt %) | COMPATIBILIZER (wt %) |
|---|---|---|---|
| A | 50 | 50 | 0 |
| B | 49 | 49 | 2 |
| C | 47.5 | 47.5 | 5 |
| D | 45 | 45 | 10 |
| E | 40 | 40 | 20 |

Blends B-E displayed improved melt strength and reduced die swelling which are indicative of improved compatibility when melt compounding polymer blends.

EXAMPLE 3 (Physical Testing)

Subsequent to blending, specimens of the blends of Example 2 were injection molded at 280° C. into standard test specimens using an Arburg Allrounder injection molding machine. Tensile and impact testing were conducted according to ASTM D638 and ASTM D256 respectively. Results are shown in Table 2.

| SAMPLE | TENSILE STRENGTH (psi) | TENSILE ELONGATION (%) | IZOD STRENGTH (22 C, ft-lb/in) |
|---|---|---|---|
| A | 8710 | 217 | 1.8 |
| B | 8870 | 225 | 1.9 |
| C | 9260 | 230 | 1.9 |
| D | 10550 | 295 | 3.0 |
| E | 10310 | 296 | 6.9 |
| Neat Polyketone | 9120 | 256 | 4.7 |
| Neat Poly-carbonate | 8820 | 198 | 15.4 |

The increase in tensile strength and tensile elongation exhibited by samples B–E over that of sample A shows the improvement in compatibility achieved through the introduction of compatibilizer. Notched impact strength increases as the amount of reactive compatabilizer in the blend increases. This is indicative of good blend compatibility since weak interfaces in the blend would have been manifested as a site for crack initiation and lesser impact strength.

We claim as our invention:

1. A compatibilized polymer blend comprising a linear alternating polymer of carbon monoxide and one or more ethylenically unsaturated hydrocarbons, a polycarbonate polymer, and a minor amount of a compatibilizer comprising about 60% wt polycarbonate and about 40% wt nylon 6.

2. The blend of claim 1 wherein the ratio of polyketone to polycarbonate is between about 3:1 and 1:3 (based upon total weight of said blend).

3. The blend of claim 1 comprising about 40 wt % of polyketone, about 40 wt % of polycarbonate, and about 20 wt % reactive graft compatibilizer.

4. The blend of claim 1 wherein said polycarbonate polymer is selected from the group consisting of $$+AR-(Z)m-Ar-O-\overset{\overset{\displaystyle O}{\|}}{C}-O\underset{p}{+} \quad \text{and} \quad +Ar-O-\overset{\overset{\displaystyle O}{\|}}{C}-O\underset{p}{+}$$

wherein Ar is selected from the group consisting of phenylene and alkyl, aryl, alkoxy, aryloxy, halogen and nitro-substituted phenylene; Z is a divalent hydrocarbon radical containing 1–15 carbon atoms, m is an integer of 0 or 1, and p is an integer of at least 2.

5. The blend of claim 1 wherein said polycarbonate polymer is a polycarbonate of bisphenol A.

6. The blend of claim 1 wherein said reactive graft compatibilizer comprsies nylon 6 and a polycarbonate of bisphenol A.

7. An article of manufacture made from the blend of claim 1.

* * * * *